United States Patent Office 3,512,283
Patented May 19, 1970

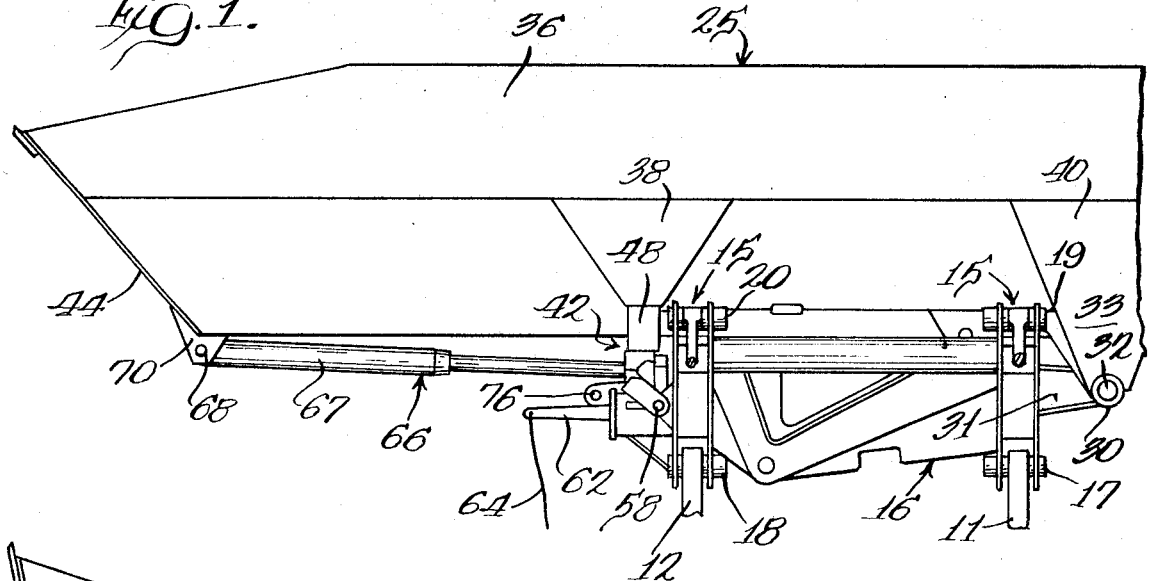
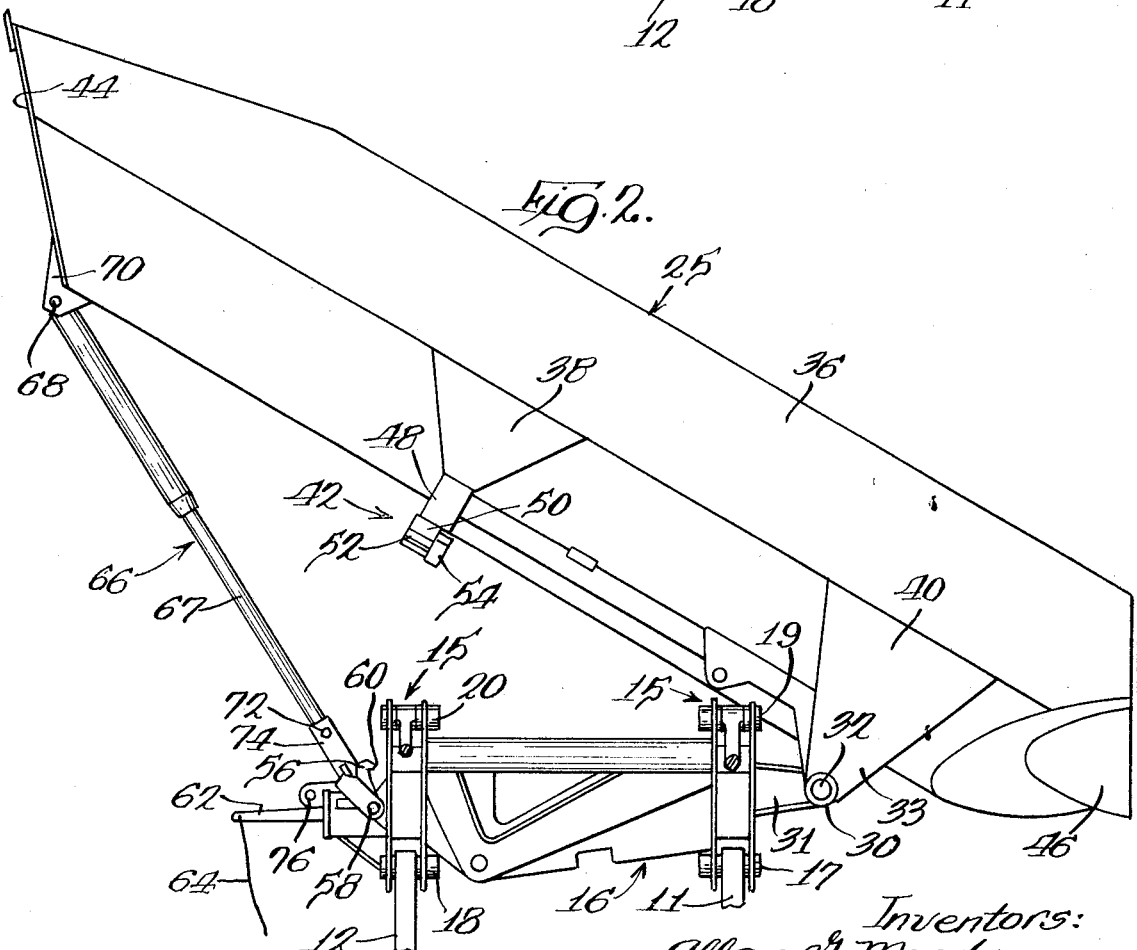

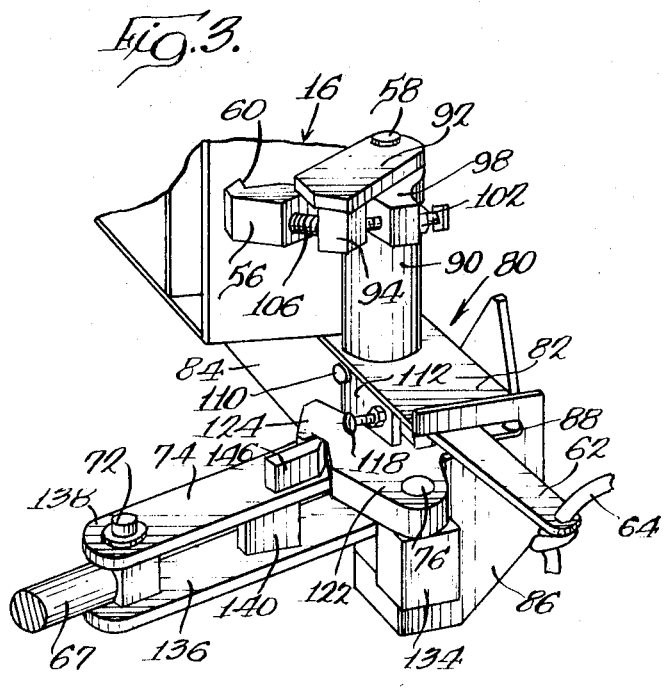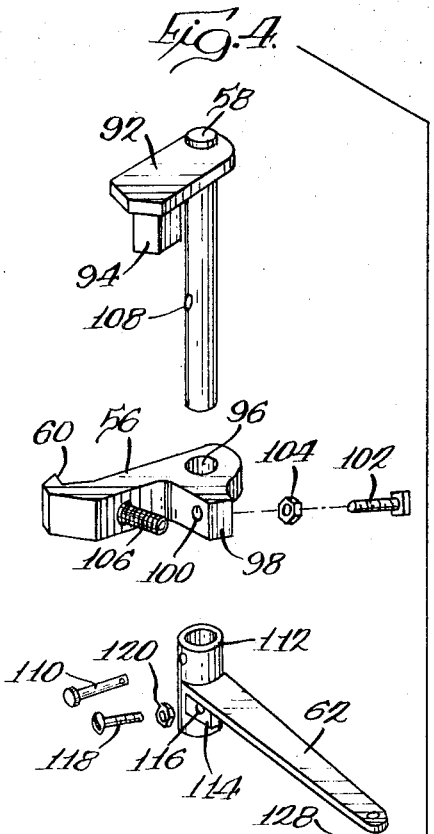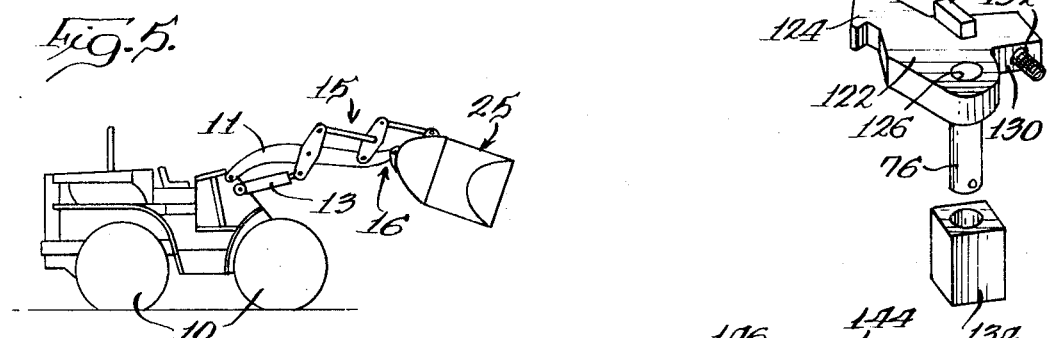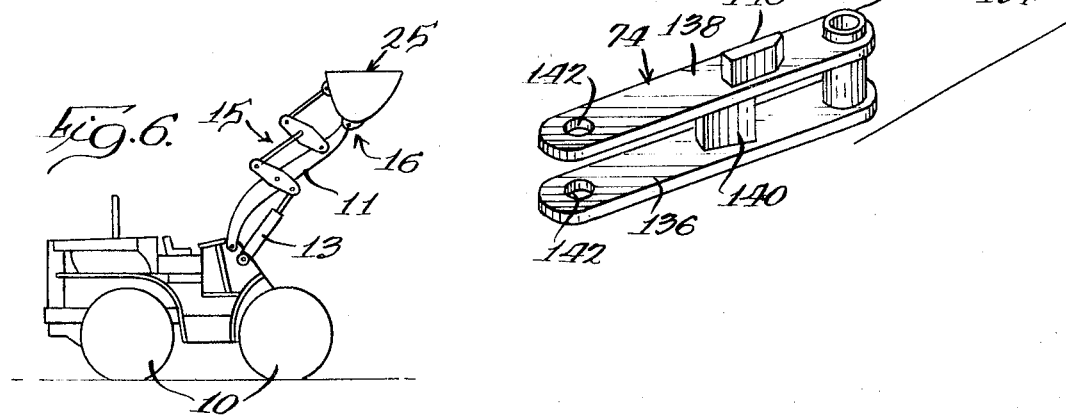

3,512,283
MATERIAL LOADER AND PLOW
Allan G. Moody and Herbert C. Glesmann, Omaha, Nebr., assignors to Omsteel Industries, Inc., a corporation of Nebraska
Filed Aug. 10, 1967, Ser. No. 659,750
Int. Cl. E02f 3/76
U.S. Cl. 37—117.5                                                 13 Claims

ABSTRACT OF THE DISCLOSURE

A combination loader and plow for mounting on movable arms on a vehicle having lift arms including a cradle to be mounted on the vehicle lift arms for movement therewith, an elongated bucket-like scoop pivotally connected to the cradle for movement between a loading position and a plowing position, a means for latching the scoop in the loading position and a means for latching the scoop in the plowing position.

BACKGROUND OF THE INVENTION

There are presently available on the market material loaders for use with a vehicle such as a tractor or a wheel loader which have a bucket mounted on lift arms and actuated by suitable mechanism to pick up a load of material and then elevate the load for discharge from the bucket. Such loaders can dump forwardly or, in some cases, to the side, with the latter type permitting dumping into another vehicle, such as a truck, with less maneuvering of the vehicle bearing the loading bucket. Such loaders can be more versatile if they can efficiently perform plowing operations, and in the copending application of Richard P. Stewart entitled "Combination Material Loader and Plow," Ser. No. 502,162, filed Oct. 22, 1965, and assigned to the same assignee as the instant application, there is disclosed a combination material loader and plow which is capable of forward dumping, side dumping and plowing.

In order to incorporate the combination side dumping and plowing feature, a number of additional mechanisms must be provided thereby adding substantially to the cost of the apparatus. In some instances, only the forward dumping and plowing features are required, and in such cases, the Stewart apparatus may be economically impractical in the sense that the mechanisms for side dumping go unused.

SUMMARY OF THE INVENTION

The principal object of the invention is to provide a new and improved combination material loader and plow.

More specifically, it is an object of the invention to provide a new and improved combination material loader and plow for accomplishing both loading and plowing that does not require side dumping mechanisms thereby reducing the number of parts.

Another object of the invention is the provision of a combination loader and plow including a cradle adapted to be pivotally mounted on the lift arms of a vehicle, an elongated bucket-like scoop connected to the cradle for movement between a loading position and a plowing position, means for latching the scoop in the loading position and means for latching the scoop in the plowing position.

Yet another object is the provision of a combination loader and plow such as that set forth in the preceding paragraph further including a collapsible strut interposed between the scoop and the cradle which is collapsed when the scoop is in the loading position and is extendable between the cradle and the scoop to support the latter in the plowing position, the means for latching the scoop in the plowing position being operative to latch the strut in the extended position wherein it supports the scoop for plowing.

A further object is the provision of a combination loader and plow such as that set forth above wherein the latching means are adjustable.

A still further object is the provision of a combination loader and plow such as that set forth above including means for simultaneously actuating both of the latching means.

Another object of the invention is the provision of a combination loader and plow including a cradle adapted to be pivotally mounted on the lift arms of a vehicle, a bucket, a means pivotally connecting the bucket near one end thereof to the cradle for free rotation to and from loading and plowing positions, and an unpowered supporting strut interposed between the bucket and the cradle to support the former in the plowing position, the strut and the pivotal connecting means being the sole means interposable between the bucket and the cradle with the bucket being movable between the positions by the influence of gravity and without the use of powered means interconnecting the bucket and the cradle.

Yet another object is the provision of a combination loader and plow including a cradle, a bucket pivotally connected to the cradle at a first point, a strut comprised of a first link pivotally connected to the cradle at a second point spaced from the first point, a second link pivotally connected to the first link and to the bucket at a third point spaced from the first point whereby the strut may be interposed between the bucket and the cradle to maintain the bucket in a plowing position, means for latching the bucket to the cradle to hold the latter in a position suitable for loading, means for latching the strut in a position interposed between the bucket and the cradle for plowing purposes and a means for releasing the latching means so that when the cradle is pivoted downwardly on a boom to which it may be attached and the first named latching means is released, the bucket will pivot due to gravity from the loading position to the plowing position to be latched therein and when the bucket is in the plowing position and the cradle is pivoted upwardly on the boom and the last named latching means is released, the bucket will pivot downwardly due to gravity to the loading position to be latched therein by the first named latching means.

Other objects and advantages of the invention will become apparent from the following specification taken in conjunction with the accompanying drawings.

DESCRIPTION OF THE DRAWINGS

FIG. 1 is a side elevation of a combination material loader and plow made according to the invention with the bucket retracted for loading;

FIG. 2 is a side elevation of the combination material loader and plow with the bucket extended for plowing;

FIG. 3 is a perspective view of a latch mechanism used in the combination loader and plow;

FIG. 4 is an exploded view of the latch mechanism;

FIG. 5 is a schematic view illustrating the manner in while the bucket of the combination loader and plow is moved from a loading position to a plowing position; and FIG. 6 is a schematic illustrating the manner in which the bucket of the combination loader and plow is returned from the plowing position to the loading position.

DETAILED DESCRIPTION

The invention disclosed herein is shown in association with the vehicle such as wheel loader Model 922A such as manufactured by Caterpillar Tractor Company, although the bucket loading and plowing structure could be used with other types of vehicles such as tracked vehicles.

As shown in FIGS. 5 and 6, the vehicle has wheels 10 and a lift structure including a pair of lift arms 11 and 12 (only one of which is shown in FIGS. 5 and 6) which may move in elevation under the control of a power cylinder (not shown), carried on the vehicle. The lift arms mount a tilt arm system having a series of levers and connecting arms indicated generally at 15 which are driven by a cylinder 13 and which connect to a cradle indicated generally at 16.

Referring now to FIGS. 1 and 2, the cradle is pivoted to the lift arms 11 and 12 at the forward ends thereof by pivot pins 17 and 18. The pivotal connection of the tilt arms 15 to the upper end of the cradle is provided by pivot pins 19 and 20.

The pivot pins 17 and 18 for the cradle pivotally mount it to the lift arms 11 and 12 and define a first pivot axis extending generally transverse to the longitudinal axis of the vehicle for the cradle and a bucket, indicated generally at 25, which is carried by the cradle 16. With the parts positioned as shown in FIG. 2, the bucket has been tilted forwardly to position the bucket in a plowing disposition in which a plowing operation can be performed. This disposition is also shown in FIG. 5. With the bucket 25 in retracted position is latched relation with the cradle 16, the cradle 16 can be tipped rearwardly about its pivot axis to place the bucket in a loading position, as shown in FIGS. 1 and 6. These various positions of the cradle can be controlled from the vehicle through the position of the tilt arm system 15, as known in the art.

The frame of the cradle 16 mounts a pivot sleeve 30 by means of a laterally extending rib 31 to receive a pivot pin 32 passing through a pair of apertured ears 33 and 34 (only one of which is shown) formed on the bucket frame structure. This construction provides a second pivot axis for the bucket 25 with this pivot axis being transverse to the pivot axis provided by the mounting of the cradle on the lift arms and to the length of the bucket 25. This pivot axis enables positioning of the bucket in a loading position (FIG. 1) or a plowing position at an angle to the cradle 16, shown in FIG. 2.

The bucket 25 includes a concave wrapper 36 which extends from top to bottom thereof when used for plowing and which forms the bottom of the bucket when the latter is used for loading purposes. The wrapper 36 has a pair of support frame members 38 and 40 at the rear thereof with the member 40 providing a support for the pivot ears 33 and 34 which pivotally mount the bucket 25 to the cradle 16. The frame member 38 provides a mounting for a portion of a first latch mechanism, generally designated 42, as best seen in FIG. 2.

One end of the bucket 25 is closed by a planar wall 44 while the opposite end thereof, as best seen in FIG. 2, is closed by a sloped panel 46 which is formed as a section of a right cylinder to form a discharge spout when plowing material such as snow. For additional details of the nature of the bucket 25, reference may be had to the above mentioned copending application of Stewart.

Referring specifically to FIG. 2, the portion of the first latch mechanism 42 mounted on the support frame member 38 will be described. A generally vertically arranged channel member 48 mounts a plate 50 on its rearwardmost side. The plate 50 includes a slot 52 in which a latch member may be received. Additionally, a rigid bar 54 is secured to the plate 50 on the rearwardmost face of the latter and at the side thereof closest to the pivot defined by the pivot pin 32.

A first latch member 56 is mounted for pivotal movement about an axis of a pivot pin 58 and is arranged such that it may be received within the slot 52 such that a hook-like end 60 of the latch member 56 will pass behind the bar 54 to latch the bucket 25 to the cradle 16 in the position shown in FIG. 1.

A lever 62 is associated with the latch member 56 for releasing the latter so that the bucket may be moved to the plowing position illustrated in FIG. 2 and will be described in greater detail hereinafter. The lever 62 may be actuated by pulling a lanyard or cord 64 connected to the lever 62 which may run to a position adjacent the seat of the operator of the vehicle. Of course, if desired a suitable electromechanical or fluid operated actuator could be used in place of the cord. However, for the purposes of economy of construction, the use of the cord 64 is preferred.

When the bucket is in the plowing position as illustrated in FIG. 2, the end thereof opposite the pivot defined by pivot pin 32 is supported outwardly from the cradle by a strut generally designated 66. The strut 66 includes a link 67 which has its forwardmost end pivotally connected by a pivot pin 68 to a pair of ears (only one of which is shown) 70 connected to the wrapper 36 adjacent the end plate 44. The link 67 has its rearwardmost end pivotally connected by a pivot pin 72 to a link 74 which in turn has its rearwardmost end pivotally mounted about the pivot pin 58. A second latch (not shown in FIG. 2) is pivoted on a pivot pin 76 which is horizontally spaced from the pivot pin 58.

Turning now to FIGS. 3 and 4, the details of the first and second latches will be described. The cradle 16, at its lower extremely, mounts a sidewardly projecting extension generally designated 80 which projects away from the pivot defined by pivot pin 32 (FIG. 2) on which the latch assemblies are mounted. The extension 80 includes a generally horizontally arranged top plate 82, a vertically arranged back plate 84 and a vertically arranged side plate 86, the latter including a slot 88 near its upper extremity through which the lever 62 protrudes.

A circular sleeve 90 is mounted on the top plate 82 and projects upwardly therefrom to journal the pivot pin 58. At the upper extremity of the pivot pin 58 there is mounted a horizontal plate 92 having a downwardly projecting lug 94 secured thereto. The latch member 56 is freely rotatable on the pivot pin 58 and interposed between the plate 92 and the upper end of the sleeve 90 and, in addition to including the hook-like end portion 60, includes a bore 96 for receipt of the pivot pin 58 and an outwardly projecting ear 98 which is approximately at right angles to the body of the latch member 56. The ear 98 includes a threaded bore 100 for receipt of a bolt 102 which may have a lock nut 104 associated therewith for adjustment purposes as will be seen hereinafter. Additionally, the body of the latch member 56 includes a relatively heavy but small spring 106 which is secured to the body of the latch member 56 by any suitable means to project in the same general direction as the ear 98.

At approximately the midpoint of the pivot pin 58 there is provided a bore 108 (FIG. 4) which is adapted to receive a lock pin 110 to affix a sleeve 112 to the pivot pin 58 for rotating the latter. The sleeve 112 has secured thereto the actuating lever 62. The location of the bore 108 is such that when the mechanism is assembled as seen in FIG. 3, the bore 108 will be located just below the undersurface of the top plate 82 of the extension 80. At the junction of the lever 62 and sleeve 112 there is provided a downwardly depending ear 114 having a threaded bore 116 therein for receipt of a bolt 118 and associated lock nut 120 which is used for adjustment purposes as will be described.

The second latch mentioned previously is numbered 122 and includes a hook-like end portion 124 together with a bore 126 which receives the pivot pin 76. The upper surface of the second latch 122 includes an upwardly projecting lug 128. In addition, there is provided an outwardly projecting ear 130 which is generally transverse to the body of the second latch member 122 and which mounts a spring 132 in a manner similar to the mounting of the spring 106 on the first latch member 56. A sleeve 134 is secured to extension 80 adjacent the outer extremity of the latter for receiving the pivot pin 76 to journal the same.

The link 74 is formed of two discrete, generally horizontal plates 136 and 138 which are spaced and re-enforced by a block 140. The forwardmost end of each of the plates 136 and 138 includes bore 142 for receipt of the pivot pin 72 which, it will be recalled, pivotally interconnects the link 74 and the link 67. Adjacent the rearmost end of the plates 136 and 138 there is provided a sleeve 144 which receives the lower end of the pivot pin 58 to pivotally connect the links 74 to the cradle 16. Finally, there is provided an upwardly projecting latch lug 146 on the upper surface of the plate 138 which cooperates with the hook-like end 124 of the second latch member 122 in a manner to be described hereinafter.

The assembled arrangement is such that the first latch member 56 is freely rotatable about the pivot pin and located at the upper extremity of the sleeve 90 with the plate 92 being located above the upper surface of the first latch member 56 such that the downwardly depending lug 94 is interposed between the spring 106 and the bolt 102. The lever 62 projects outwardly through the slot 88 and, when moved by an operator of the vehicle, will cause rotation of the pivot pin 58. The second latch member 122 is arranged such that the spring 132 associated therewith abuts the inner surface of the end plate 86 and the lug 128 is located rearwardly of the ear 114 associated with the lever 62 such that the adjustment bolt 118 will bear against the lug 128. Finally, the lug 146 on the link 74 is arranged so that it may be engaged by the hook-like end portion 124 of the second latch member 122.

When the operator of the vehicle pulls on the cord 64, the lever 62 will be moved generally counterclockwise as viewed in FIGS. 3 and 4 thereby rotating the pivot pin 58 in a counterclockwise direction. As a result, the lug 94 will bear against the end of the bolt 102 to rotate the first latching member 56 in a counterclockwise direction about the pivotal axis provided by the pivot pin 58. From the foregoing description of FIG. 2 and more specifically the first latch mechanism portion 42 illustrated in FIG. 2, it will be apparent that such counterclockwise movement of the first latching member 156 will retract the hook-like end portion 60 thereof from engagement with the bar 54. Thus, the bucket 25 will be unlatched so that it may move from a loading position to a plowing position in a manner to be described hereinafter.

Counterclockwise movement of the lever 62 will also cause the end of the bolt 118 to bear against the lug 28 of the second latching member 122 thereby causing the latter to pivot in a clockwise direction about the pivotal axis provided by pivot pin 76 to cause the hook-like end portion 124 to retract from its latching engagement, if any, with the lug 146 and the link 74. Thus, both the first latching member 56 and the second latching member 122 will be simultaneously released although, as will become apparent hereinafter, only one or the other will be in latching engagement at any given instant.

When the operation releases the cord 64, the lever 62 will be moved to its original position by action of the spring 132 such that the latches may be subsequently engaged. The manner in which this action takes place is as follows. Since the spring 132 bears against the stationary plate 86, it will be apparent that the second latching member 122 is always biased in a generally counterclockise direction. Such a bias will be transmitted through the lug 128 against the bolt 118 and thus the lever 62.

The overall operation of the combination material loader and plow is as follows. If it be assumed that the bucket 25 is initially in a loading position as illustrated in FIG. 1 and it is desired to move the bucket to the plowing position illustrated in FIG. 2, the hook-like end portion 60 of the first latching member 56 will be engaged in latching relation with the bar 54 while the strut 66 will be in the position illustrated in FIG. 1 with the link 74 being directed inwards toward the pivot pin 32. The lift arms 11 of the vehicle are then raised a short distance above the ground and the tilt arms 15 are arranged such that the bucket will generally face downwardly about the pivot provided by the pins 17 and 18. The operator will then pull on the cord 64 to move the lever 62 in a counterclockwise direction thereby releasing the first latch member 56 in the manner described previously.

Under the influence of gravity, the bucket 25 will swing about the pivot provided by pivot pins 32 in a generally clockwise direction as viewed in FIG. 2 until such movement is restrained by movement of the strut 66 to the position illustrated in FIG. 2. During such movement, the lug 146 on the link 74 will engage the hook-like end portion 124 of the second latch member 122 which is configured such that the lug 146 will cam the second latch member 122 in a clockwise direction about the pivot provided by pivot pin 76. At some point in such movement, the lug 146 will move into the hook-like end portion 124 of the second latch member and the constant bias applied by the spring 132 will cause the second latch member to move in a counterclockwise direction (providing the operator has released the cord) to latchingly engage the lug 146. At this point, the strut 66 is latched in an extended position as illustrated in FIG. 2 and the bucket 25 may be used for plowing purposes.

In order to return the bucket 24 to a loading position from the plowing position, the lift arms 11 and 12 are raised in the manner generally illustrated in FIG. 6 and the tilt arms 15 operated such that the bucket 25 opens upwardly. Again, the operator will pull on the cord 64 and the resulting movement will retract the second latch member 122 from latching engagement with the lug 146 in the manner described previously. Under the influence of gravity, the relatively straight support provided by the link 67 and the link 74 will collapse with the point defined by the pivot pin 72 moving toward the pivot pin 32 and the bucket 25 will rotate about the pivot pin 32 in a counterclockwise direction until further movement is restrained by the encountering of the rear side of the bucket 25 with the cradle 16. During the latter part of such movement, the rearwardmost side of the bar 54 will engage a forwardmost end of the hook-like end portion 60 of the first latch 56 which is configured such that the first latch member 56 will be cammed in a generally counterclockwise direction against the bias of the spring 106 until the hook-like end portion 60 is latched behind the bar 54.

At such a point, the bias applied by the spring 106 will cause the first latch member 56 to move in a clockwise direction to latch the bucket 25 to the cradle 16 (providing that the operator has released the cord 64).

It will be recognized that for movement of the bucket 25 from the plowing position to the loading position, the support for the bucket provided by the link 67 and the link 74 must be arranged such that, as viewed in FIG. 2, the axis provided by the pivot pin 72 will not move to the left of a straight line drawn between the axis provided by the pivot pin 68 and the axis provided by the pivot pin 58. In fact, it is preferable that the axis of the pivot pin 72 be maintained at a location just slightly tothe right of such a straight line (as seen in FIG. 2) and for such purposes, suitable stop means that restrict movement of the link 74 in a counterclockwise direction about the pivot pin 58 may be provided. Such an arrangement is required in order to insure that the link 74 will pivot in a clockwise direction about the pivot pin 58 when the bucket 25 is returned to the loading position.

In order to provide for smooth positive latching of both the first latching member 56 and the second latching member 122, their respective angular positions with respect to the actuating lever 62 may be adjusted by suitable disposition of the bolts 102 and 118 within their respective threaded bores. The provision for such adjustment is highly desirable in that it enables the latching mechanism to be fabricated with relatively loose tolerances for which compensation may be made through such adjustment.

We claim:

1. A combination loader and plow for mounting on movable arms on a vehicle, said loader and plow comprising, in combination: a cradle adapted to be mounted on said arms for movement therewith; an elongated bucket-like scoop; means pivotally connecting said cradle to said scoop at one point thereof whereby said scoop can pivot on said cradle between a loading position approximately parallel to said cradle and a plowing position at an angle to said cradle and pivoted away from said cradle; means on said loader and plow for latching said scoop in said loading position; and means on said loader and plow for latching said scoop in said plowing position; said loader and plow further including strut means connected to said scoop and said cradle at points spaced from said one point and interposable between said scoop and said cradle to maintain said scoop pivoted away from said cradle in said plowing position, said last-named latching means comprising means for engaging said strut means and for latching the same in a position interposed between said scoop and said cradle.

2. The invention of claim 1 wherein said first named latching means comprises a first movable hook member adapted to engage said scoop and said last named latching means comprises a movable hook adapted to engage said strut means.

3. The invention of claim 1 further including releasing means for simultaneously actuating both of said latching means.

4. The invention of claim 3 wherein said first named latching means comprises a first member having a hook-like end and mounted for pivotal movement about a first pivot axis; said last named latching means comprises a second member mounted for pivotal movement about a second pivot axis; and said releasing means includes a single lever operatively associated with both said first and second members for simultaneously rotating the same to move both said latching means from a latching position.

5. The invention of claim 4 wherein said first pivot axis is defined by a pivot pin on which said first member is freely rotatable; means connecting said lever to said pivot pin; means secured to said pivot pin for engaging said first member to rotate the same when said pivot pin is rotated by said lever; and means associated with said lever for engaging said second member to rotate the same when said lever is rotated.

6. A combination loader and plow for mounting on movable arms on a vehicle, said loader and plow comprising, in combination: a cradle adapted to be mounted on said arms for movement therewith; an elongated bucket-like scoop; means pivotally connecting said cradle to said scoop at one point thereon whereby said scoop can pivot on said cradle between a loading position approximately parallel to said cradle and a plowing position at an angle to said cradle; means on said loader and plow for latching said scoop in said loading position; means on said loader and plow for latching said scoop in said plowing position; and a single actuator for said latching means and means defining an adjustable connection between each of said latching means and said actuator.

7. A combination loader and plow comprising:
   (a) a cradle adapted to be pivotally mounted on the lift arms of a vehicle;
   (b) a bucket pivotally mounted at one end on said cradle and movable between a first position wherein the bucket substantially abuts the cradle for loading purposes and a second position wherein the bucket is angularly related to the cradle for plowing purposes;
   (c) collapsible means interconnecting said bucket and said cradle and extendable to maintain said bucket in said second position;
   (d) a first latch mechanism on said loader and plow for latching said bucket to said cradle in said first position;
   (e) a second latch mechanism on said loader and plow for latching said collapsible means in an extended condition maintaining said bucket in said second position; and
   (f) a single actuator for simultaneously moving both of said latch mechanisms to a releasing position.

8. The combination loader and plow of claim 7 wherein each of said latch mechanisms comprises a pivotally mounted member having a hook-like end portion and said single actuator comprises a means for simultaneously pivoting both of said members.

9. The combination loader and plow of claim 7 wherein said first latch mechanism comprises a first hook-like element pivotally mounted for movement about a first axis; said second latch mechanism comprises a second hook-like member pivotally mounted for movement about a second axis spaced from said first axis; means biasing said members in opposite direction about their respective axes; said actuator comprising a single lever pivotally mounted about said first axis and including first means for engaging said first member to rotate the same against said bias and second means for engaging said second member to rotate the same against said bias.

10. The combination loader and plow of claim 9 wherein said first and second engaging means each include adjustable connections.

11. In a combination loader and plow the structure comprising: a cradle adapted to be pivotally connected to a boom on a vehicle; a bucket pivotally connected to the cradle at a first point; a strut comprised of a first link pivotally connected to the cradle at a second point spaced from said first point, a second link pivotally connected to the first link and to the bucket at a third point spaced from said first point whereby the strut may be interposed between the bucket and the cradle to maintain the bucket in a plowing position; means on said structure for latching the bucket to the cradle in a loading position; means on said structure for latching said strut in a position interposed between said bucket and said cradle; and means for releasing said latching means whereby when said cradle is pivoted downwardly on the boom and said first named latching means is released, said bucket will pivot due to gravity from said loading position to said plowing position and be latched thereby by said last named latching means and when said bucket is in said plowing position, said cradle is pivoted upwardly on the boom and said last named latching means is released, said bucket will pivot due to gravity to said loading position and be latched therein by said first named latching means.

12. The invention of claim 11 wherein said first named latching means comprises a latch bar on said bucket, a first hook-like latch member on said cradle and adapted to engage said bar, a pivot pin journalling said first latch member and including a projection engaging said first latch member, a spring interposed between said latch member and said projection; said last named latching means comprising a latch lug on said first link, a second hook-like latch member adapted to engage said lug, means pivotally mounting said second latch member, and a spring interposed between the cradle and said second latch member; and said releasing means comprises a lever fixed to said pivot pin and having a projection engaging said second latch member.

13. A combination material loader and plow including a vehicle having lift arms; a cradle pivotally mounted on the lift arms of the vehicle for relative pivotal movement about a first axis; a bucket adapted to alternately be used for loading and plowing; means pivotally connecting said bucket near one end thereof to said cradle for free rotation about a second axis transverse to said first axis to and from a loading position abutting said cradle and a plowing position wherein the bucket is angularly related to said cradle; an unpowered supporting strut movably connected to said bucket and to said cradle, and movable to be interposed between said bucket and said cradle to support said bucket in said plowing position; said pivotal connecting means and said strut being the sole means interposable between said bucket and said cradle whereby said bucket may be moved between said positions by gravity by changing the attitude of the cradle on said lift arms about said first axis and without the use of powered means interconnecting the bucket and the cradle; and means on said loader and plow for holding said bucket in either of said positions and comprising latch means on said loader and plow for engaging said bucket to hold the same in said loading position and for engaging said strut to hold the same interposed between said bucket and said cradle to support said bucket in said plowing position.

References Cited

UNITED STATES PATENTS

| | | | |
|---|---|---|---|
| 2,565,337 | 8/1951 | Allan | 172—804 |
| 2,821,313 | 1/1958 | Warner | 214—768 |
| 3,198,358 | 8/1965 | Gardner | 214—145 |
| 3,207,342 | 9/1965 | Trojan | 214—768 |
| 3,312,364 | 4/1967 | Granryd | 214—768 |
| 3,313,437 | 4/1967 | Eriksson | 214—768 |
| Re. 26,268 | 9/1967 | Keskitalo | 214—768 |

ROBERT E. PULFREY, Primary Examiner

E. H. EICKHOLT, Assistant Examiner

U.S. Cl. X.R.

172—804; 214—768